(12) United States Patent
Suzuki et al.

(10) Patent No.: US 9,366,300 B2
(45) Date of Patent: Jun. 14, 2016

(54) CALIPER BRAKE APPARATUS

(71) Applicant: KAYABA INDUSTRY CO., LTD., Minato-ku, Tokyo (JP)

(72) Inventors: Tsutomu Suzuki, Kanagawa (JP); Yoshiyuki Ookawara, Kanagawa (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/433,856

(22) PCT Filed: Jan. 15, 2014

(86) PCT No.: PCT/JP2014/050554
§ 371 (c)(1),
(2) Date: Apr. 6, 2015

(87) PCT Pub. No.: WO2014/115617
PCT Pub. Date: Jul. 31, 2014

(65) Prior Publication Data
US 2015/0275989 A1     Oct. 1, 2015

(30) Foreign Application Priority Data

Jan. 25, 2013    (JP) .................................. 2013-012493

(51) Int. Cl.
*F16D 55/22*     (2006.01)
*F16D 65/00*     (2006.01)
(Continued)

(52) U.S. Cl.
CPC .............. *F16D 65/0068* (2013.01); *B61H 5/00* (2013.01); *F16D 55/225* (2013.01);
(Continued)

(58) Field of Classification Search
CPC .......... F16B 43/02; B61H 5/00; B61H 13/00; F16D 65/0068; F16D 65/18; F16D 65/84; F16D 2055/0016; F16D 2055/0091; F16D 55/225; F16D 55/2265

USPC ......... 188/71.1, 72.1, 72.4, 74, 250 B, 250 D, 188/250 E, 250 G
See application file for complete search history.

(56) References Cited

U.S. PATENT DOCUMENTS

| 1,935,348 | A | * | 11/1933 | Blume | F16D 69/0416 188/234 |
| 2,164,015 | A | * | 6/1939 | Kateley | F16D 69/0416 188/234 |
| 3,767,018 | A | * | 10/1973 | Gordon | B29C 37/0082 188/250 G |

(Continued)

FOREIGN PATENT DOCUMENTS

| JP | 52-160782 U | 12/1977 |
| JP | 63-303212 A | 12/1988 |
| JP | 2-39989 U | 3/1990 |
| JP | 10-267058 A | 10/1998 |
| JP | 2003-269434 A | 9/2003 |

(Continued)

OTHER PUBLICATIONS

International Search Report and Written Opinion mailed Feb. 10, 2014 corresponding to International application No. PCT/JP2014/050554.

*Primary Examiner* — Christopher Schwartz
(74) *Attorney, Agent, or Firm* — Hauptman Ham, LLP

(57) ABSTRACT

A caliper brake apparatus includes a piston configured to advance and retreat in accordance with a pressure in a pressure chamber of a caliper main body, a guide plate attached to the piston so as to support a brake shoe, and a fastening member configured to fasten the piston to the guide plate. The fastening member includes a tapered seating surface, and at least one of the piston and the guide plate includes a tapered contact portion on which the seating surface of the fastening member is seated.

6 Claims, 4 Drawing Sheets

(51) Int. Cl.
*B61H 5/00* (2006.01)
*F16D 65/18* (2006.01)
*F16D 55/224* (2006.01)
*F16D 55/225* (2006.01)
*F16D 65/12* (2006.01)
*F16B 43/02* (2006.01)
*F16D 55/00* (2006.01)
*F16D 121/08* (2012.01)

(52) U.S. Cl.
CPC ....... *F16D 55/2245* (2013.01); *F16D 65/0056* (2013.01); *F16D 65/124* (2013.01); *F16D 65/18* (2013.01); *F16B 43/02* (2013.01); *F16D 2055/0008* (2013.01); *F16D 2055/0016* (2013.01); *F16D 2121/08* (2013.01)

(56) References Cited

U.S. PATENT DOCUMENTS

| 4,858,732 | A  | * | 8/1989 | Taylor, Jr. | F16D 69/0416 188/250 G |
| 2010/0044167 | A1 | * | 2/2010 | Suzuki | B61H 5/00 188/72.3 |
| 2011/0233009 | A1 | * | 9/2011 | Suzuki | F16D 65/18 188/72.4 |
| 2015/0053510 | A1 | * | 2/2015 | Suzuki | B61H 5/00 188/71.6 |

FOREIGN PATENT DOCUMENTS

| JP | 2011-47430 A | 3/2011 |
| JP | 2011-202669 A | 10/2011 |

* cited by examiner

CALIPER BRAKE APPARATUS

TECHNICAL FIELD

The present invention relates to a caliper brake apparatus configured to apply a brake to rotation of a vehicle wheel by applying frictional force to a brake disc that rotates together with the vehicle wheel.

BACKGROUND ART

A brake apparatus that applies a brake to rotation of a vehicle wheel using fluid pressure such as oil pressure or air pressure is employed conventionally in a railway vehicle.

JP2011-202669A discloses a caliper brake apparatus in which a piston is moved by increasing air pressure so as to inflate a diaphragm, thereby causing a brake block (a brake shoe) to slide against a brake disc of a vehicle wheel.

SUMMARY OF INVENTION

In a caliper brake apparatus such as that described above, the brake shoe is supported by a guide plate, and the guide plate is attached to the piston. The guide plate and the piston are fastened to each other by inserting a pin provided on the piston into a hole portion formed in the guide plate, and bending a tip end of the pin so that the pin does not escape from the hole portion. With a fastening method in which the pin of the piston and the hole portion of the guide plate are engaged, however, an engagement part between the pin and the hole portion is likely to become worn due to vibration and the like, leading to a reduction in fastening force between the guide plate and the piston.

An object of the present invention is to provide a caliper brake apparatus with which a reduction in fastening force between the guide plate and a piston can be suppressed.

According to an aspect of the present invention, a caliper brake apparatus configured to apply a brake to a vehicle wheel by applying frictional force to a disc that rotates together with the vehicle wheel is provided. The caliper brake apparatus includes a caliper main body, and a piston provided to be free to advance into the caliper main body and retreat out of the caliper main body, the piston being configured to advance and retreat in accordance with a pressure in a pressure chamber of the caliper main body. Also the caliper brake apparatus includes a brake shoe configured to be capable of applying frictional force to the disc by sliding against the disc, a guide plate attached to the piston so as to support the brake shoe, and a fastening member configured to fasten the piston to the guide plate. The fastening member has a tapered seating surface. At least one of the piston and the guide plate includes a tapered contact portion on which the seating surface of the fastening member is seated.

DESCRIPTION OF EMBODIMENTS

An embodiment of the present invention will be described below with reference to the figures.

First, referring to FIGS. 1 and 2, an overall configuration of a caliper brake apparatus 100 according to this embodiment will be described.

The caliper brake apparatus 100 is a brake apparatus for a railway vehicle. The caliper brake apparatus 100 uses air as a working fluid. The caliper brake apparatus 100 applies a brake to rotation of a vehicle wheel 1 by causing a brake shoe 30 to slide against a disc 1A of the vehicle wheel 1 such that frictional force is applied to the disc 1A.

Figure 1:
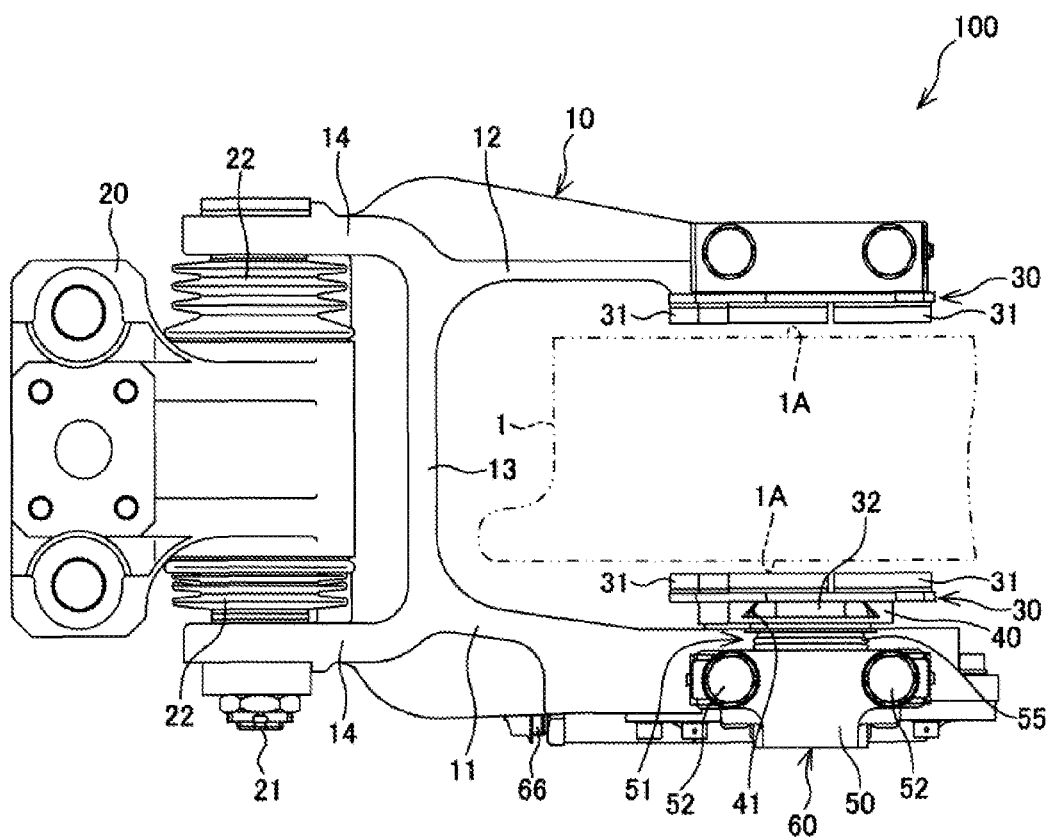
FIG. 1 is a plan view of a caliper brake apparatus according to an embodiment of the present invention.
Figure 2:
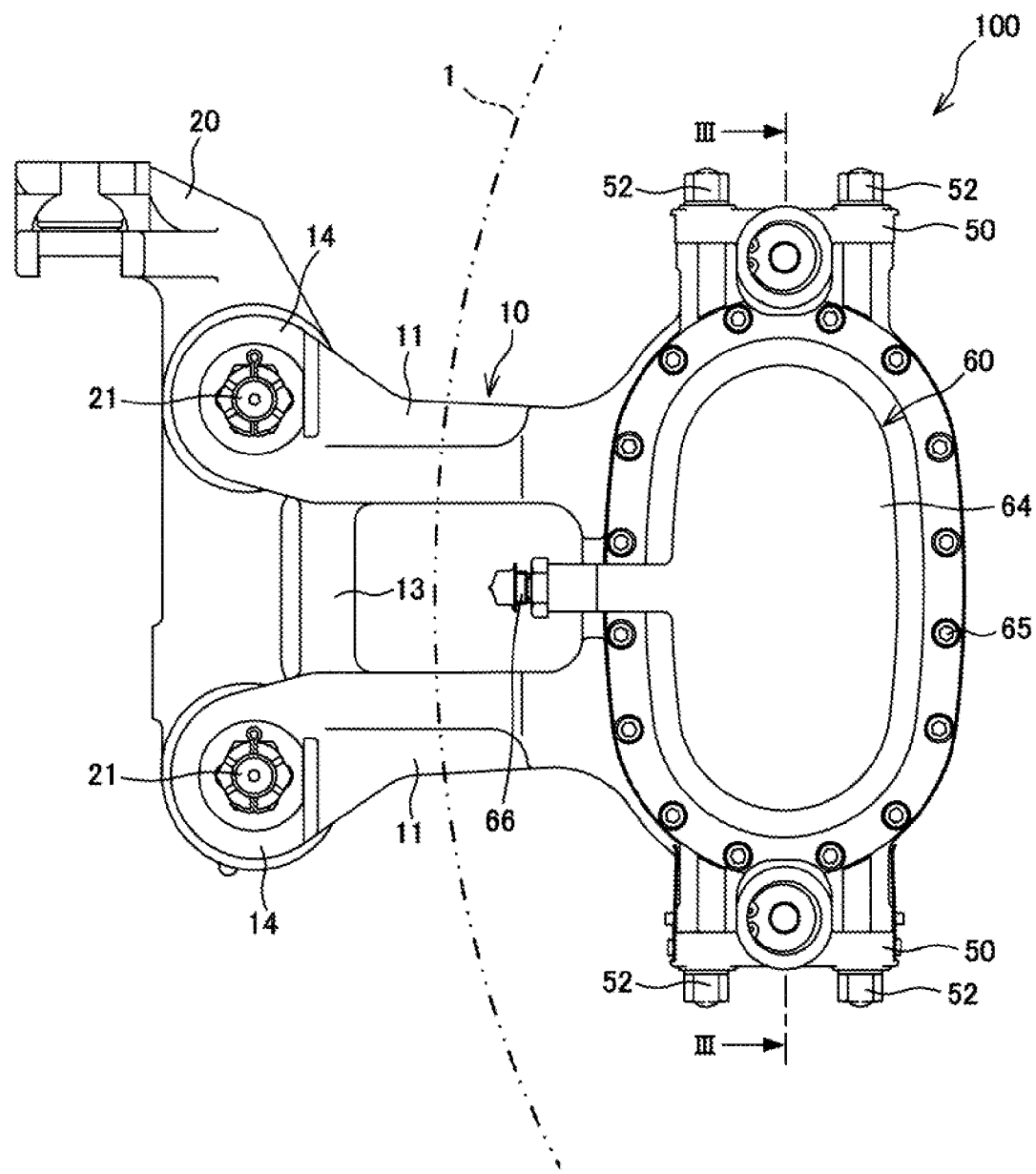
FIG. 2 is a front view of the caliper brake apparatus.

As shown in FIGS. 1 and 2, the caliper brake apparatus 100 includes a caliper main body 10, a support frame 20 that is fixed to a vehicle body so as to support the caliper main body 10, a pair of brake shoes 30 provided on the caliper main body 10 so as to oppose the vehicle wheel 1 from either side, a guide plate 40 that supports one of the brake shoes 30, an anchor pin 51 that is provided on the caliper main body 10 to be free to advance and retreat, and supports the guide plate 40, and a pressing mechanism 60 that presses the brake shoes 30 toward the disc 1A using air pressure.

The disc 1A against which the brake shoe 30 slides is formed on both outside and inside end surfaces of the vehicle wheel 1. The disc 1A is a brake disc that rotates integrally with the vehicle wheel 1. It should be noted that in the caliper brake apparatus 100, the disc 1A is formed integrally with the vehicle wheel 1, but the disc 1A may be attached to the vehicle wheel 1 as a separate member.

The caliper main body 10 includes a first caliper arm 11 and a second caliper arm 12 that extend so as to straddle the vehicle wheel 1, a caliper yoke 13 that connects the first caliper arm 11 and the second caliper arm 12, and a bracket 14 that extends from the caliper yoke 13 on an opposite side to the vehicle wheel 1 side. The caliper main body 10 is attached to the support frame 20 via the bracket 14.

The bracket 14 of the caliper main body 10 is formed in a two-pronged shape so as to oppose the support frame 20 from either side. The bracket 14 and the support frame 20 are connected via an upper-lower pair of slide pins 21.

The slide pins 21 penetrate the support frame 20 and the bracket 14 of the caliper main body 10, and respective end portions of the slide pins 21 are fixed to the bracket 14. Further, the slide pins 21 are provided to be capable of sliding relative to the support frame 20. The caliper main body 10 is supported floatingly on the support frame 20 via the slide pins 21 so as to be capable of moving in an axial direction of the slide pins 21.

The slide pins 21 positioned between the support frame 20 and the bracket 14 are covered by rubber dust boots 22. As a result, dust and the like are prevented from infiltrating sliding parts between the slide pins 21 and the support frame 20.

The brake shoes 30 are provided on respective tip ends of the first caliper arm 11 and the second caliper arm 12 of the caliper main body 10 so as to oppose the discs 1A of the vehicle wheel 1. Each brake shoe 30 includes a lining 31 that slides against the disc 1A of the vehicle wheel 1.

The brake shoe 30 on the first caliper arm 11 side is pressed by the pressing mechanism 60 so as to slide against the disc 1A of the vehicle wheel 1. This brake shoe 30 is configured such that a back surface thereof on an opposite side to a surface provided with the lining 31 is attached to the guide plate 40. An engagement groove 41 capable of engaging with an engagement plate 32 (see FIG. 1) provided on the back surface of the brake shoe 30 is formed in the guide plate 40 so as to extend in a lengthwise direction. The guide plate 40 is supported on the caliper main body 10 by the anchor pin 51, to be described below.

In the caliper brake apparatus 100, when the brake shoe 30 on the first caliper arm 11 side is pressed by the pressing mechanism 60 so as to slide against one of the discs 1A of the vehicle wheel 1, the caliper main body 10 moves relative to the support frame 20 in the axial direction of the slide pins 21 such that the brake shoe 30 on the second caliper arm 12 side slides against the other disc 1A of the vehicle wheel 1. A brake is applied to rotation of the vehicle wheel 1 by frictional force generated when the linings 31 of the brake shoes 30 slide against the discs 1A.

Next, referring to FIG. 3, an internal configuration of the first caliper arm 11 constituting a part of the caliper main body 10 will be described.

The first caliper arm 11 of the caliper main body 10 includes an upper-lower pair of support mechanisms 50 for supporting the guide plate 40, and the pressing mechanism 60 positioned between the support mechanisms 50.

Each support mechanism 50 includes a pin reception portion 53 that is fixed to the first caliper arm 11 by an anchor bolt 52, the anchor pin 51 provided to be capable of advancing and retreating relative to the pin reception portion 53, and a return spring 54 configured to bias the anchor pin 51 in an advancement direction into the pin reception portion 53. The anchor pin 51 is configured to support the guide plate 40 on which the brake shoe 30 is disposed relative to the first caliper arm 11.

The anchor pin 51 is a closed end cylinder-shaped member provided to be free to advance into and retreat from the pin reception portion 53.

The anchor pin 51 positioned in an upper portion of the first caliper arm 11 includes a flange portion 51A that projects in a radial direction from an outer peripheral surface positioned on an outer side of the pin reception portion 53. A fitting groove 43 that is fitted to the flange portion 51A of the anchor pin 51 is formed in an upper end part of the guide plate 40 on the periphery of an insertion hole 42 for inserting the anchor pin 51. When the flange portion 51A is fitted into the fitting groove 43 of the guide plate 40, the upper end side anchor pin 51 supports the guide plate 40.

The anchor pin 51 positioned in a lower portion of the first caliper arm 11 includes an annular groove portion 51B provided as a recess in an outer peripheral surface positioned on the outer side of the pin reception portion 53. A U-shaped cutout portion 44 through which the anchor pin 51 passes is formed in a lower end part of the guide plate 40, and an inner edge of an upper half of the cutout portion 44 is fitted into the annular groove portion 51B of the anchor pin 51. When the cutout portion 44 of the guide plate 40 is engaged with the annular groove portion 51B, the lower end side anchor pin 51 supports the guide plate 40.

The return spring 54 is housed in the interior of each of the two anchor pins 51. The return springs 54 are coil springs that serve as biasing members for returning the anchor pins 51 to their initial positions using biasing force when a braking condition is switched to a non-braking condition.

The anchor pins 51 are configured such that respective parts thereof that are exposed to the outside during braking are covered by rubber dust boots 55. As a result, dust and the like are prevented from infiltrating the pin reception portions 53.

The pressing mechanism 60 includes a cylinder 61 provided on the first caliper arm 11 between the upper and lower support mechanisms 50, a piston 70 provided to be free to advance and retreat relative to the cylinder 61, and a diaphragm 63 provided so as to define a pressure chamber 62 inside the first caliper arm 11 when in contact with a back surface of the cylinder 70.

An inner peripheral surface of the cylinder 61 is formed in a substantially elliptical shape, and the piston 70 is housed in the cylinder 61. A caliper cover 64 that closes a cylinder open end on the back surface side of the piston 70 is fixed to the cylinder 61 via a bolt 65.

The diaphragm 63 is an elastic membrane made of rubber. The diaphragm 63 is disposed on the back surface side of the piston 70 such that an outer edge portion 63A thereof is sandwiched between an end surface of the cylinder 61 and an end surface of the caliper cover 64. The pressure chamber 62 is defined by the diaphragm 63 and the caliper cover 64. The diaphragm 63 deforms elastically in response to air pressure in the pressure chamber 62, thereby causing the piston 70 to advance and retreat. It should be noted that the pressure chamber 62 is connected to an external air pressure supply source via a through hole 66 (see FIG. 2).

The diaphragm 63 includes the outer edge portion 63A, a contact portion 63B that contacts the back surface of the piston 70, and a folded back portion 63C formed continuously between the outer edge portion 63A and the contact portion 63B.

The outer edge portion 63A of the diaphragm 63 is sandwiched between the cylinder 61 and the caliper cover 64. The outer edge portion 63A functions as a seal member, and therefore airtightness is secured in the air chamber 62.

The folded back portion 63C of the diaphragm 63 is positioned in a gap between the cylinder 61 and the piston 70. The folded back portion 63C is configured to be capable of deforming between a folded back condition and an extended condition in accordance with the air pressure in the pressure chamber 62.

The contact portion 63B of the diaphragm 63 contacts the back surface of the piston 70 so as to press the piston 70 in accordance with the air pressure in the pressure chamber 62. When the air pressure in the pressure chamber 62 increases such that the diaphragm 63 expands, the piston 70 pressed by the contact portion 63B of the diaphragm 63 moves in a retreating direction, or in other words a leftward direction in FIG. 3.

The piston 70 is a substantially elliptical disc member. The piston 70 is held within the cylinder 61 by the contact portion 63B and the folded back portion 63C of the diaphragm 63. A dust seal 67 that slides against an outer peripheral surface of the piston 70 is provided on an inner peripheral surface of the cylinder 61, and dust and the like are prevented from infiltrating the cylinder 61 by the dust seal 67.

The guide plate 40 is attached to a front surface of the piston 70 such that an insulation board 90 is sandwiched between the guide plate 40 and the front surface of the piston 70. The guide plate 40 and the piston 70 are fastened to each other by screwing a nut 82 disposed on the back surface side of the piston 70 to a bolt 81 disposed on a front surface side of the guide plate 40 via a washer 83 and a plate spring 84. As a result, the guide plate 40 is fixed to the piston 70 by upper and lower pairs of the bolt 81 and the nut 82.

The bolt 81 is a flathead bolt having a hexagonal hole. Each bolt 81 includes a head portion 81A on which a conical tapered seating surface 81B (a bolt side seating surface) is formed, and a screw shaft 81C provided to extend from the head portion 81A.

The nut 82 is configured to be screwed to the screw shaft 81C of the bolt 81.

The washer 83 is penetrated by the screw shaft 81C, and includes a conical tapered seating surface 83A (a nut side seating surface). An inner diameter of the washer 83 is set to be larger than an outer diameter of the screw shaft 81C of the bolt 81 so as not to contact the screw shaft 81C.

The plate spring 84 is a disc-shaped spring member that is penetrated by the screw shaft 81C, and is disposed between the washer 83 and the nut 82. An inner diameter of the plate spring 84 is set to be larger than the outer diameter of the screw shaft 81C of the bolt 81 so as not to contact the screw shaft 81C.

As described above, the bolt 81, the nut 82, the washer 83, and the plate spring 84 together constitute a fastening member 80 for fastening the guide plate 40 to the piston 70.

Two first housing recessed portions 45 capable of housing the head portions 81A of the bolts 81 are formed in the front surface of the guide plate 40 at a removed from each other in a vertical direction. Further, second housing recessed portions 71 capable of housing the nuts 82, the washers 83, and the plate springs 84 are formed in the back surface of the piston 70 in positions corresponding to the first housing recessed portions 45.

Figure 4:
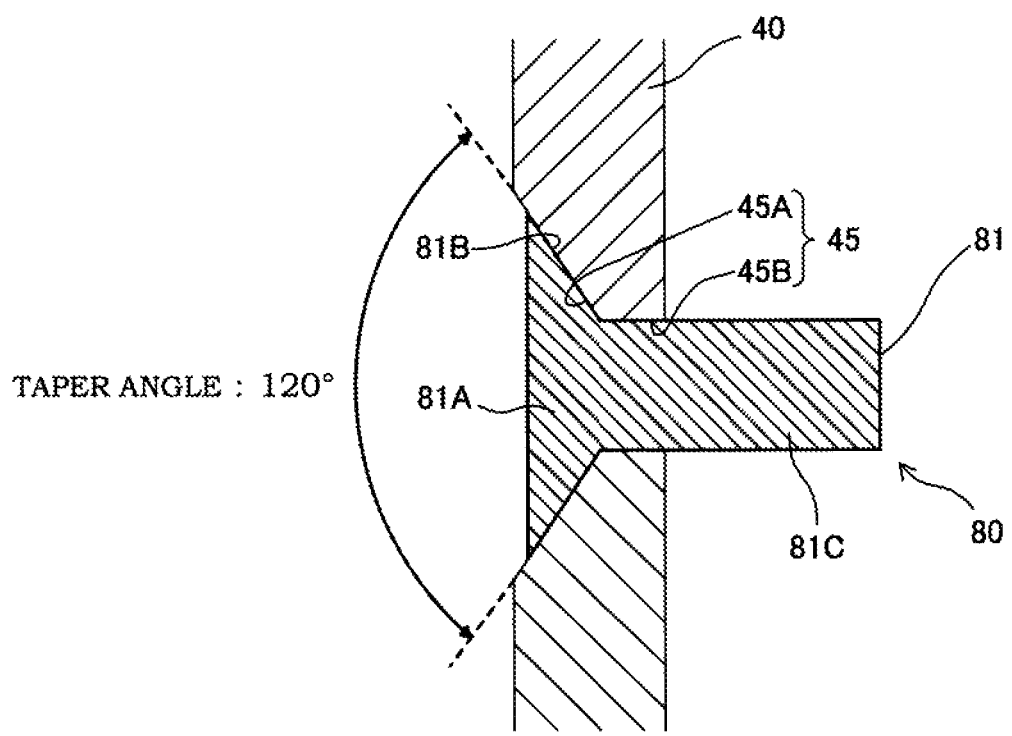
FIG. 4 is a schematic sectional view showing a guide plate and a bolt of the caliper brake apparatus.

A tapered bolt contact portion 45A on which the seating surface 81B of the bolt 81 is seated, and a first insertion hole 45B for inserting the screw shaft 81C of the bolt 81 are formed in each first housing recessed portion 45. As shown in FIG. 4, a taper angle formed by the seating surface 81B of the bolt 81, or in other words an angle formed by two lines extending along tapered surfaces in positions deviating from each other by 180° in a circumferential direction of the bolt 81, is set at 120°. A taper angle formed by a contact surface of the bolt contact portion 45A is also set at 120° in accordance with the seating surface 81B of the bolt 81.

Figure 3:
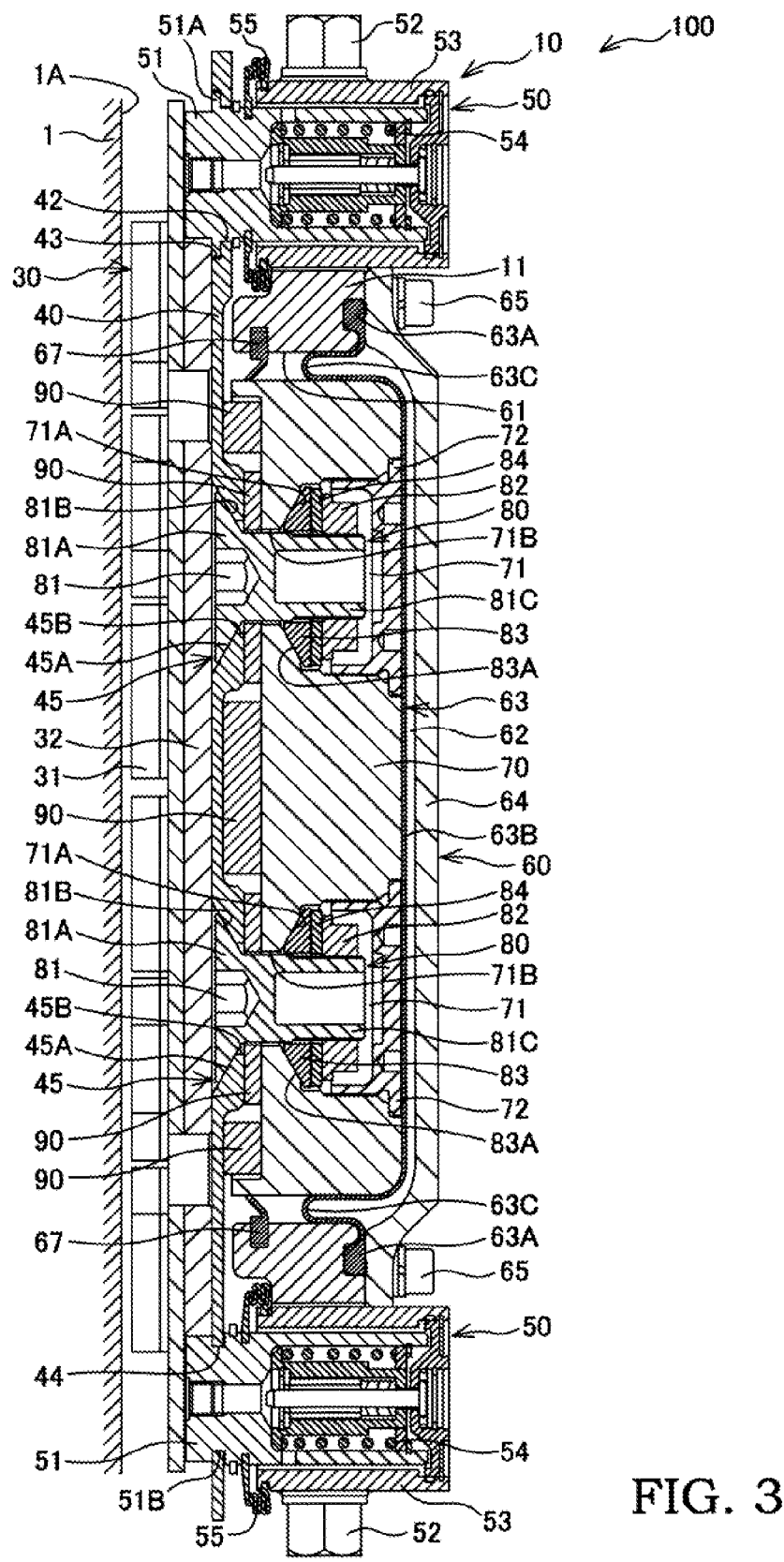
FIG. 3 is a sectional view of the caliper brake apparatus, taken along III-III in FIG. 2.

As shown in FIG. 3, a tapered washer contact portion 71A on which the seating surface 83A of the washer 83 is seated, and a second insertion hole 71B for inserting the screw shaft 81C of the bolt 81 are formed on a bottom surface of each second housing recessed portion 71. A taper angle formed by the seating surface 83A of the washer 83 is set at 120°, and a taper angle formed by a contact surface of the washer contact portion 71A is also set at 120° in accordance with the seating surface 83A of the washer 83.

In a condition where the seating surface 81B of the head portion 81A of the bolt 81 is disposed in contact with the bolt contact portion 45A, the screw shaft 81C of the bolt 81 projects into the second housing recessed portion 71 through the first insertion hole 45B in the first housing recessed portion 45, an insertion hole in the insulation board 90, and the second insertion hole 71B in the second housing recessed portion 71. The nut 82 is screwed to the screw shaft 81C of the bolt 81 projecting in this manner via the washer 83 and the plate spring 84. At this time, the seating surface 83A of the washer 83 contacts the washer contact portion 71A.

In the caliper brake apparatus 100, the guide plate 40 is fixed to the front surface side of the piston 70 by screwing the bolt 81 disposed in the first housing recessed portion 45 to the nut 82 disposed in the second housing recessed portion 71. When the guide plate 40 and the piston 70 are fastened, the head portion 81A of the bolt 81 does not project forward from the bolt contact portion 45A. In other words, a depth of the bolt contact portion 45A is set to be greater a thickness of the head portion 81A of the bolt 81 in a depth direction (a left-right direction in FIG. 3).

It should be noted that cap members 72 are fitted into respective open ends of the second housing recessed portions 71 forming air chambers such that the second housing recessed portions 71 are closed by the cap members 72.

In the caliper brake apparatus 100 configured as described above, the guide plate 40 and the piston 70 are fastened to each other by the bolts 81 and the nuts 82 constituting the fastening members 80. When the guide plate 40 and the piston 70 are fastened, the tapered seating surface 81B of each bolt 81 contacts the tapered bolt contact portion 45A of the first housing recessed portion 45, and the tapered seating surface 83A of each washer 83 contacts the tapered washer contact portion 71A of the second housing recessed portion 71. By bringing the seating surface 81B of the bolt 81 into surface contact with the bolt contact portion 45A and bringing the seating surface 83A of the washer 83 into surface contact with the washer contact portion 71A in this manner, contact parts of these members are unlikely to become worn even when the guide plate 40 and so on vibrate. Hence, the screw fastening between the bolt 81 and the nut 82 is unlikely to loosen, and as a result, a reduction in fastening force between the guide plate 40 and the piston 70 is suppressed.

Further, when the guide plate 40 and the piston 70 are fixed by screwing the nut 82 to the bolt 81, the seating surface 81B of the bolt 81 moves along the bolt contact portion 45A, and the seating surface 83A of the washer 83 moves along the washer contact portion 71A. Therefore, the guide plate 40 and the piston 70 can be positioned automatically. As a result, the guide plate 40 and the piston 70 can be positioned easily.

The bolt contact portion 45A is formed as an indentation in the guide plate 40, and the depth of the bolt contact portion 45A is set to be greater than the thickness of the head portion 81A of the bolt 81. Therefore, the head portion 81A of the bolt 81 does not project from the bolt contact portion 45A, and as a result, interference between the brake shoe 30 and the bolt 81 when the brake shoe 30 is attached to the guide plate 40 can be avoided.

In the caliper brake apparatus 100, the plate spring 84 is disposed between the washer 83 and the nut 82. Vehicle vibration and frictional heat generated by the sliding contact between the disc 1A of the vehicle wheel 1 and the brake shoe 30 are input repeatedly into the bolt 81 and the nut 82, but external force and the like can be absorbed by a spring action of the plate spring 84, and therefore the bolt 81 and the nut 82 can be prevented from loosening. As a result, a reduction in the fastening force between the guide plate 40 and the piston 70 can be further suppressed.

Furthermore, the respective inner diameters of the washer 83 and the plate spring 84 are set to be greater than the outer diameter of the screw shaft 81C of the bolt 81 so as not to contact the screw shaft 81C. Therefore, frictional heat generated during braking is unlikely to be transmitted to the washer 83 and the plate spring 84 from the bolt 81, and as a result, thermal expansion of the washer 83 and the plate spring 84 caused by frictional heat generated during braking can be suppressed. Hence, loosening of the screw fastening between the bolt 81 and the nut 82 due to expansion and contraction of the washer 83 and the plate spring 84 is unlikely to occur, and as a result, a reduction in the fastening force between the guide plate 40 and the piston 70 can be suppressed even more reliably.

In the caliper brake apparatus 100, the insulation board 90 is interposed between the guide plate 40 and the piston 70, and therefore frictional heat generated by the sliding contact between the disc 1A of the vehicle wheel 1 and the brake shoe 30 is unlikely to be transmitted to the piston 70. Hence, transmission of frictional heat to the diaphragm 63 disposed on the back surface of the piston 70 can be suppressed, and as a result, thermal deterioration of the diaphragm 63 can be prevented.

In the caliper brake apparatus 100, the second housing recessed portion 71 is formed as an air chamber, and therefore heat transmitted to the nut 82 housed in the second housing recessed portion 71 is unlikely to be transmitted to the diaphragm 63. As a result, transmission of frictional heat to the diaphragm 63 can be suppressed.

An embodiment of the present invention was described above, but the above embodiment is merely one example of an application of the present invention, and the technical scope of the present invention is not limited to the specific configurations of the above embodiment.

In the caliper brake apparatus 100 according to the embodiment described above, the seating surface 81B of the bolt 81 of the fastening member 80 contacts the bolt contact portion 45A, and the seating surface 83A of the washer 83 of the fastening member 80 contacts the washer contact portion 71A. However, the seating surface 81B of the bolt 81 and the bolt contact portion 45A of the guide plate 40 alone may be formed in a tapered shape, or conversely, the seating surface 83A of the washer 83 and the washer contact portion 71A of the piston 70 alone may be formed in a tapered shape. Likewise with this configuration, in which the tapered seating surfaces 81B, 83A included in the fastening member 80 contact at least one of the tapered contact portions 45A, 71A of the guide plate 40 and the piston 70, the contact parts of these members are unlikely to become worn, and as a result, a reduction in the fastening force between the guide plate 40 and the piston 70 can be suppressed.

In the caliper brake apparatus 100, the taper angles of the seating surface 81B of the bolt 81, the seating surface 83A of the washer 83, the bolt contact portion 45A, and the washer contact portion 71A are set at 120°, but are not limited to this angle, and may be set at any desired angle in accordance with requirements.

In the caliper brake apparatus 100, the tapered seating surface 81B is formed on the bolt 81 and the tapered seating surface 83A is formed on the washer 83, but the present invention is not limited to this configuration, and instead of forming the seating surface 81B on the head portion 81A of the bolt 81, a washer having a tapered seating surface may be provided between the head portion 81A of the bolt 81 and the bolt contact portion 45A of the guide plate 40, for example. Further, instead of providing the washer 83 having the tapered seating surface 83A between the nut 82 and the washer contact portion 71A of the piston 70, a tapered seating surface may be formed on the nut 82. Moreover, the two configurations described above may be employed simultaneously. In this case, a washer having a tapered seating surface is provided between the head portion 81A of the bolt 81 and the bolt contact portion 45A of the guide plate 40, and a tapered seating surface is formed on the nut 82.

This application claims priority based on Japanese Patent Application No. 2013-12493, filed with the Japan Patent Office on Jan. 25, 2013, the entire contents of which are incorporated into this specification by reference.

The invention claimed is:

1. A caliper brake apparatus configured to apply a brake to a vehicle wheel by applying frictional force to a disc that rotates together with the vehicle wheel, comprising:
   a caliper main body;
   a piston provided to be free to advance into the caliper main body and retreat out of the caliper main body, the piston being configured to advance and retreat in accordance with a pressure in a pressure chamber of the caliper main body;
   a brake shoe configured to be capable of applying frictional force to the disc by sliding against the disc;
   a guide plate attached to the piston so as to support the brake shoe; and
   a fastening member configured to fasten the piston to the guide plate,
   wherein the fastening member has a tapered seating surface,
   at least one of the piston and the guide plate includes a tapered contact portion on which the seating surface of the fastening member is seated, and
   the piston includes a housing recessed portion that forms an air chamber capable of housing a part of the fastening member, and a cap member configured to close an open end of the housing recessed portion.

2. The caliper brake apparatus as defined in claim 1, wherein the fastening member comprises:
   a bolt having a screw shaft;
   a tapered bolt side seating surface positioned between the bolt and the guide plate; and
   a nut screwed to the screw shaft.

3. The caliper brake apparatus as defined in claim 2, wherein the bolt includes a head portion on which the bolt side seating surface is formed, and the screw shaft provided to extend from the head portion,
   the guide plate includes a first housing portion having a tapered bolt contact portion on which the bolt side seating surface is seated, and a first insertion hole into which the screw shaft is inserted, and
   the guide plate is fastened to the piston by screwing the nut to the screw shaft projecting to the piston side through the first insertion hole.

4. The caliper brake apparatus as defined in claim 3, wherein the bolt contact portion is formed as an indentation in the guide plate, and
   a depth of the bolt contact portion is set to be greater than a thickness of the head portion of the bolt.

5. The caliper brake apparatus as defined in claim 1, wherein the fastening member comprises:
   a bolt having a screw shaft;
   a nut screwed to the screw shaft; and
   a tapered nut side seating surface positioned between the nut and the piston.

6. The caliper brake apparatus as defined in claim 5, wherein the fastening member further comprises a washer that is configured to be penetrated by the screw shaft and includes the nut side seating surface,
   the piston includes a second housing portion that serves as the housing recessed portion, and includes a tapered washer contact portion on which the nut side seating surface of the washer is seated, and a second insertion hole into which the screw shaft is inserted, and
   the guide plate is fastened to the piston by screwing the nut to the screw shaft projecting to the second housing portion side through the second insertion hole via the washer.

* * * * *